April 27, 1965  B. J. SABIN ETAL  3,180,606
WEDGE LOCKING BRACKET
Filed Dec. 4, 1962

INVENTORS
BYRON J. SABIN
HARRY H. ROSE
BY
Walter F. Wessendorf Jr
Attorney

United States Patent Office 3,180,606
Patented Apr. 27, 1965

3,180,606
WEDGE LOCKING BRACKET
Byron J. Sabin, 36 Venezio Ave., Guilderland, N.Y., and
Harry H. Rose, 23 Salisbury Road, Bethlehem, N.Y.
Filed Dec. 4, 1962, Ser. No. 242,192
3 Claims. (Cl. 248—239)

This invention relates to an article of manufacture, entitled wedge locking bracket, to be utilized as a support bracket, preferably for utilization with a wall of a refrigerator to support thereby an article such as a rack, etc. on the support stud included with the wedge locking bracket.

The problem in the art to which this invention appertains is to provide a wedge locking bracket for use as a support bracket that is cheap to manufacture, is of unitary construction and of durable quality.

It is therefore an object of this invention to provide a wedge locking bracket for use as a support bracket of suitable resilient plastic material and with all of the elements of the wedge locking bracket integral.

It is another object of this invention to provide a wedge locking bracket for use as a support bracket that upon suitable emplacement of same with its associated aperture formed in a refrigerator wall structure, the wedge locking bracket will be wedgingly locked in place.

Another object of the invention is to provide a wedge locking bracket for use as a support bracket having a locking pin and support holding member such that upon suitable emplacement of the support holding member through and with the aperture of a refrigerator wall the pin is relieved from abutment with the wall and into the aperture to provide positive locking engagement.

These and other objects of the invention should be appreciated from the detailed specification taken in conjunction with the drawings, in which like reference numerals refer to similar parts throughout the several views, in which.

The support wedge locking brackets as hereinafter described are made of suitable resilient plastic material and are of unitary construction.

Figure 1:
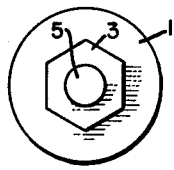
FIG. 1 is a top plan view showing one species of a configured flange and its associated support stud that may be utilized with one of the support holding members.
Figure 2:
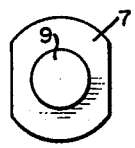
FIG. 2 is a top plan view showing another species of a configured flange and its associated support stud that may be utilized with another one of the embodiments of the support holding members.

In FIG. 1, a circularly shaped flange 1 has a raised portion of a hexagonal shape 3 with a support stud 5 further extending therefrom. In FIG. 2, flange 7 as configured comprises a circular configuration with two similar and symmetrical sectors removed therefrom and a support stud 9 extending therefrom. The embodiments shown in FIGS. 1 and 2 may be utilized with either of the support holding members hereinafter described.

The raised portion of hexagonal shape 3 and the flange 7 are examples of structures which when manipulated by respective tools of complemental configurations permit as well as facilitate assembly of their respective wedge locking brackets with a refrigerator wall. Support studs 5 and 9 are examples of structures for support of a refrigerator rack.

Figure 3:
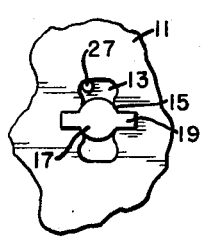
FIG. 3 is a bottom view of an assembly of a refrigerator wall aperture and one of the embodiments of the support holding members.

In FIG. 3 is shown a wall 11 with configured aperture 13 with a support holding member 15 in assembled engagement therewith. Support holding member 15 has a circular portion 17 and two symmetrically arranged and oppositely extending portions 19.

Figure 4:
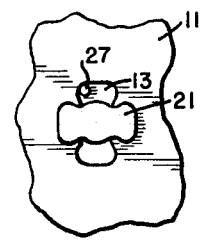
FIG. 4 is a top paln view of an assembly of a refrigerator wall aperture and another of the embodiments of the support holding members.

In FIG. 4 is shown wall 11 with the same configured aperture 13 with a support holding member 21 in assembled engagement therewith. Supporting holding member 21 is of a configuration similar to aperture 13 but dimensionally less than aperture 13 to allow member 21 to be freely insertable through aperture 13.

Figure 5:
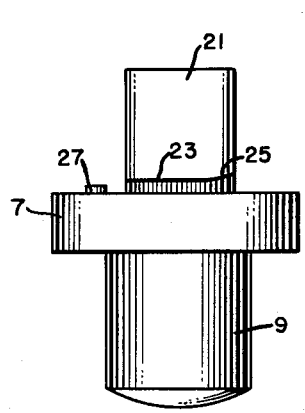
FIG. 5 is an elevational view of the support bracket of FIGS. 2 and 4.
Figure 6:
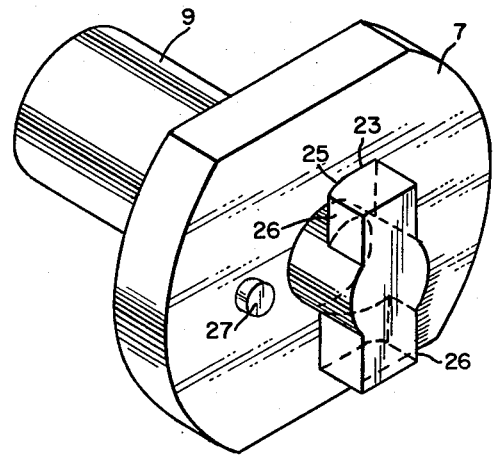
FIG. 6 is a perspective view of the embodiment shown in FIG. 5.

In FIG. 5 is shown a unitary construction of one of the wedge locking brackets that structurally embodies the flange 7 and support stud 9 of the species shown in FIG. 2 with the other embodiment of the support holding member 21 shown in FIG. 4.

The structural difference between members 15 and 21, as shown in the drawings, is the fact that member 21 is complemental in configuration to aperture 13 but dimensionally less than aperture 13 to allow member 21 to be freely insertable through aperture 13; while with respect to the structure of member 15, the extending portions 19 are not only not complemental to aperture 13, but also dimensionally generate less of a dimensional area in comparison to those portions of member 21 which correspond to extending portions 19. Nevertheless, both members 15 and 21 structurally have similar undercuts 23 formed on opposed sides of members 15 and 21. Both members 15 and 21 additionally have the following similar structure that is shown with reference to member 21, i.e., the undercuts 23 have upward arcuate configured portions 25 curving away from flange 7 to their respective leading edges 26.

Each of the members 15 and 21 have a locking pin 27 upstanding from the particular integral flange associated therewith and for purposes as will be described. The height of locking pin 27 is similar dimensionally to the height of the arcuately configured upward portions 25 of the undercuts 23.

Member 15 or 21 is inserted through aperture 13 and then manipulated by an appropriate tool in a 90° direction. The dimension of undercut 23 is sufficiently similar to the nonuniform thickness (arising out of manufacture) of refrigerator wall 11 to achieve a snug and wedging fit when placed in engagement with aperture 13. The opposed, but arcuately extending upward portions 25 facilitate the initial angular movement of member 15 or 21 relative to aperture 13.

Further angular movement of member 15 or 21 effectuates wedging of the supporting holding member and its flange relative to wall 11 and partial deformation results in the support holding member and the flange with resulting locking engagement thereon.

90° turning of the support holding member relative to the locus of first insertion of the support holding member in the aperture 13 permits locking pin 27 integral with the flange to be relieved within the aperture 13 as shown and thereby to provide positive locking engagement.

Having thusly described our invention, we claim:

1. A wedge locking bracket adapted to be secured in a wall structure having an aperture by inserting same through said aperture and angularly moving same relative to said aperture, and adapted to support an article such as a rack; said wedge locking bracket being of integral construction and comprising a support stud, a flange, a support holding member and a locking pin; said support stud extending from said flange and adapted to support said article, said flange adapted to abut said wall structure upon securement of said wedge locking bracket therewith, said support holding member having undercuts adjacent said flange, said undercuts being formed on opposite sides of said support holding member, said undercuts having arcuate configured portions curving upwardly away from said flange to their respective leading edges, said locking pin being upstanding from said flange and having a height essentially the same dimensionally as the height each of said upwardly configured portions extend from each of said opposed undercuts; all of said structure being so cooperatively and correlatively, associated, arranged and constructed such that upon insertion of said support holding member through said aperture and upon angular movement of said support holding member relative to said aperture said flange and support holding member wedgingly engage said wall structure, and said locking pin is relieved in said aperture to positively position said wedge locking bracket and lock said wedge locking bracket in place as positioned.

2. A wedge locking bracket adapted to be secured in a wall structure having an aperture by inserting same through said aperture and angularly moving same relative to said aperture, said wedge locking bracket being of integral construction and having a flange, a support holding member, a locking pin and a support stud; said flange adapted to abut said wall structure upon securement of said wedge locking bracket therewith, said support stud extending from said flange and supporting thereby an article, said support holding member having undercuts adjacent said flange, said undercuts being formed on opposite sides of said support holding member, said undercuts having arcuate configured portions curving upwardly away from said flange to their respective leading edges, said locking pin being upstanding from said flange and having a height essentially the same dimensionally as the height each of said upwardly configured portions extending from each of said opposed undercuts; all of said structure being so cooperatively and correlatively, associated, arranged and constructed such that upon insertion of said support holding member through said aperture and upon angular movement of said support holding member relative to said aperture said flange and support holding member wedgingly engage said wall structure, and said locking pin is relieved in said aperture to positively position said wedge locking bracket and lock said wedge locking bracket in place as positioned.

3. A wedge locking bracket in combination with wall structure having an aperture, said wedge locking bracket being secured in said wall structure by inserting same through said aperture and angularly moving said wedge locking bracket relative to said aperture, said wedge locking bracket being of integral construction and comprising a flange, a support holding member, a locking pin and a support stud; said flange abutting said wall structure upon securement of said wedge locking bracket therewith, said support stud extending from said flange for supporting thereby an article, said support holding member having a configuration similar to the configuration of said aperture, said support holding member having undercuts adjacent said flange, said undercuts being formed on opposite sides of said support holding member, said undercuts having arcute configured portions curving upwardly away from said flange to their respective leading edges, said locking pin being upstanding from said flange and having a height essentially the same dimensionally as the height each of said upwardly configured portions extend from each of said opposed undercuts; all of said structure being so cooperatively and correlatively, associated, arranged and constructed such that upon insertion of said support holding member through said aperture and upon angular movement of said support holding member relative to said aperture said flange and support holding member wedgingly engage said wall structure, and said locking pin is relieved in said aperture to positively position said wedge locking bracket and lock said wedge locking bracket in place as positioned.

References Cited by the Examiner
UNITED STATES PATENTS

| | | | |
|---|---|---|---|
| 2,133,781 | 10/38 | Johnson | 248—239 |
| 2,571,641 | 10/51 | Wing | 85—1 |
| 2,626,773 | 1/53 | Backman | 248—239 |
| 2,657,894 | 11/53 | Sklenar | 248—239 |
| 2,826,388 | 3/58 | Janos et al. | 248—239 |
| 2,909,352 | 10/59 | Van Buren | 248—239 |
| 2,940,558 | 6/60 | Schleuter | 189—36 |
| 3,078,064 | 2/63 | Turnbull | 248—239 |

FOREIGN PATENTS 1,112,265 8/61 Germany.

CLAUDE A. LE ROY, *Primary Examiner.*